United States Patent Office 3,261,977
Patented July 19, 1966

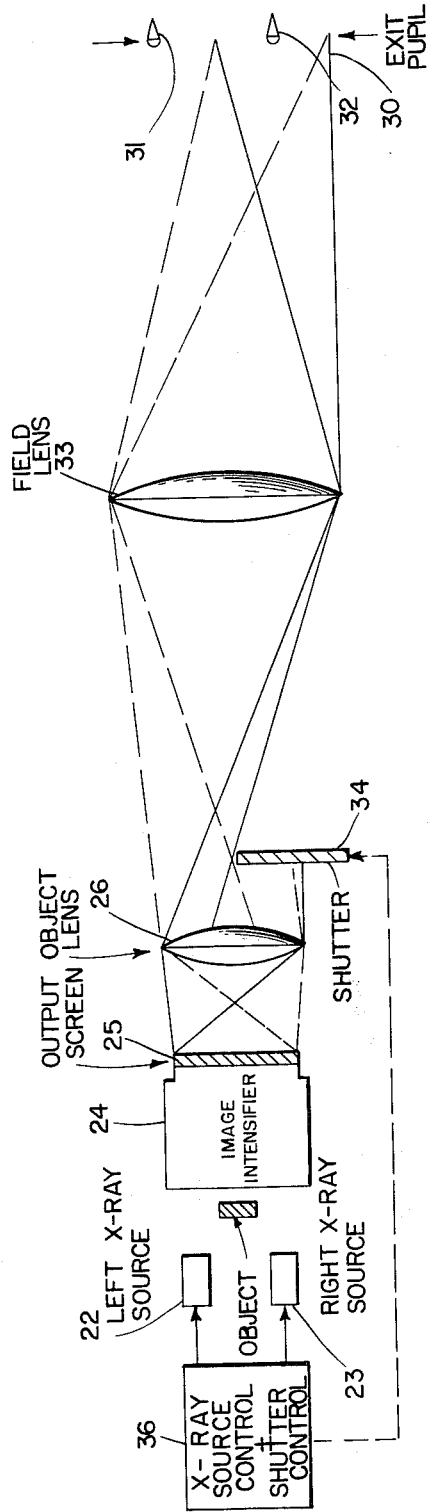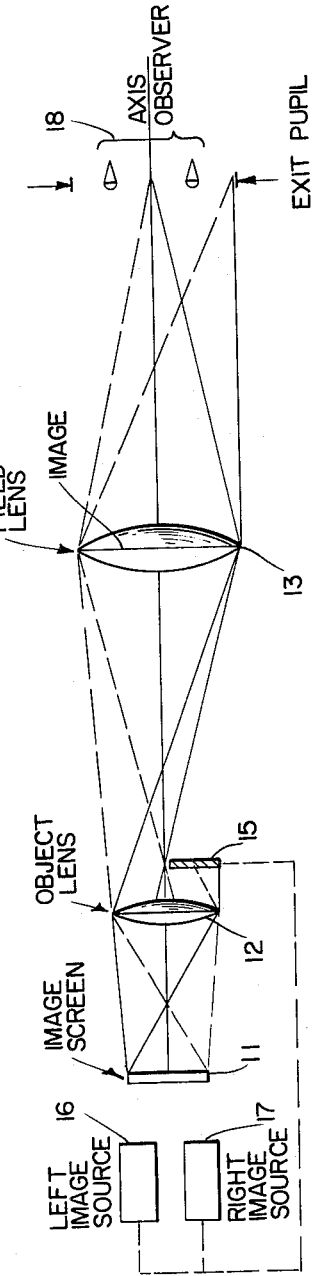

3,261,977
STEREOSCOPIC OPTICAL VIEWING SYSTEM WITH A SHUTTER ELEMENT ADJACENT THE OBJECT LENS
Cornelius G. J. M. Van Der Velden, Framingham, Mass., assignor, by mesne assignments, to Laboratory For Electronics, Inc., Boston, Mass., a corporation of Delaware
Filed Aug. 25, 1961, Ser. No. 133,938
5 Claims. (Cl. 250—60)

This invention relates in general to optical systems and, more particularly, to a stereoscopic viewing system.

Stereoscopic image viewing is a well-developed art and a great variety of devices have been constructed in order to permit a viewer observing planar images to obtain a three-dimensional effect. Many of the devices employed were designed to present two spaced-apart planar images representing different angular views of the same object as a simultaneous three-dimensional image to the observer. In general, these devices present the image corresponding to the left eye view, to a left eye piece while presenting the view corresponding to the right hand view to a right eye piece. In many instances the limitation of a pair of eye pieces is undesirable and, hence, as a sophistication, systems were developed which presented the image through a single large eye piece. These system utilized a pair of optical systems arranged to focus each of the views through the lens of the large eye piece at an angle such that is was essentially focussed on the left and right eye, respectively, of the observer. While this system removed the limitation of a pair of eye pieces, the exact focussing of the beams was, of course, critical and required the observer to hold his head rigidly in a fixed position corresponding to the beams being properly focussed on his left and right eyes.

Other stereoscopic systems do not employ spaced-apart planar images, but rather superposed images, which are then separated in order to provide one image to the left eye and the other to the right eye. In general, such systems have employed polarized light beams with corresponding polarized eye pieces formed into a pair of spectacles for viewing. Such systems impose the limitation of spectacles on the viewer and, additionally, with a fixed image position, rotation of the viewer's head will change the light intensity coming from the image. Other stereoscopic systems involve alternate viewing of superposed images; that is, a left hand view image is presented and then a right hand view image is presented with the alternation taking place at a frequency such that the eyes are not aware of the alternate nature of the presentation but rather view it as a simultaneous presentation. Such systems have proved particularly useful in stereoscopic X-ray fluoroscopy, since the dosage to the patient is not increased as it would have to be in a simultaneous presentation. One system known in the art for accomplishing this type of X-ray fluoroscopy involves the use of alternate X-ray sources with the images corresponding to the left and right hand images being projected on the fluoroscopic screen. The alternating X-ray sources are operated in conjunction with a specially prepared head piece in which a shutter closes off alternately the left and right hand eye pieces so that the left eye views only the image corresponding to a left hand view of the fluoroscoped object and the right eye views only the image corresponding to the right hand view of this same object. Such a head piece is, of course, unwieldy and places limitations on the radiologist operating the system since he must, from time to time, view the patient directly and since the eye piece encumbers his movement of the appropriate fluoroscopic controls.

It is, therefore, a primary object of the present invention to provide an economic, accurate stereoscopic viewing system for viewing alternately superposed images which does not require any eye pieces to be worn by the observer.

It is another object of the present invention to provide a stereoscopic viewing system for three-dimensional presentation of a pair of alternately presented, superposed images involving only a single optical system, which does not require the observer to wear eye pieces.

It is still another object of the present invention to provide a stereoscopic viewing system for viewing alternately superposed images and thereby obtaining a three-dimensional effect, and in which the observer is not required to maintain his head in a precisely fixed position.

It is yet another object of the present invention to provide a stereoscopic viewing system for stereoscopic X-ray fluoroscopy which does not unduly limit the observer and operator of the fluoroscopy unit.

Other objects and advantages will become apparent from the following detailed description when taken in conjunction with the accompanying drawing in which:

FIG. 1 is an illustration in diagrammatic form of an optical system in accordance with the principles of this invention; and FIG. 2 is an illustration in diagrammatic form of a stereoscopic fluoroscopy system in accordance with the principles of this invention.

With reference now specifically to FIG. 1, an image screen 11 is positioned so that it may receive images projected from either left image source 16 or right image source 17. The image screen may be formed in a variety of ways depending upon the exact application; for example, it may be a ground glass screen or a phosphor screen. The image producing sources are arranged to project their respective images on the image screen 11 in alternate superposition. The left image source is a view of the imaged object as it would appear from the left eye of an observer and the right image source is the view as it would appear from the right eye of the observer. Image sources may take any of several forms and typically might be a television picture tube, a projector or a pair of projectors; for example, a single movie camera projector in which alternate frames of the movie film representing left and right hand views would produce the alternate images. An object lens 12, which may be any suitable positive lens, typically a double convex lens, and a field lens 13 are positioned to form the optical viewing system for an observer positioned at 18. The distance between the object lens and the field lens and the object are selected with respect to the focal lengths of the lenses such that an exit pupil is formed at 14 having a diameter large enough so that both eyes of the observer can comfortably fit within it. According to optical principles, an observer at the exit pupil 14 sees an image in the field lens 13 and either eye anywhere within the exit pupil will see this image in proper focus. A shutter element 15 is placed on the output side of object lens 12. This shutter may be located anywhere between the object lens 12 and the point of intersection between the axis of the lens system and a straight line connecting the perimeter of the object lens 12 to the perimeter of the field lens 13. Preferably, however, it is placed in close juxtaposition to the object lens 12. This shutter would typically be a semi-circular opaque piece or a circular piece which has one-half opaque and the other half transparent. The shutter 15 is rotated so that alternately the left and right hand halves of the object lens are blocked by the opaque section of the shutter. The shutter need not be circular, but may take any suitable form for alternately masking first one half and then the other of the object lens. The alternation of the image projection from image sources 16 and 17 is synchronized with the revolution of the shutter 15, such that the shutter 15 is blocking out the right hand side of the object lens, as seen from the position of the observer 18, when the right image source is projecting its image on the screen 11 and the shutter is blocking out the left side of the object lens, when the left image view is being projected on the screen 11. When the shutter is blocking out the left hand side of the object lens, then no light rays are presented to the right hand side of the exit pupil, while on the left hand side of the exit pupil an image of the entire image screen 11 can be seen. Thus, if the observer has his right eye anywhere in the right hand side of the exit pupil and his left eye anywhere in the left hand side of the exit pupil, his left eye sees the entire image being projected on the screen, while the light rays to his right eye have all been intercepted. Conversely, when the shutter is on the opposite side of the object lens, the observer's right eye sees the entire image and his left eye sees nothing. The images are projected alternately at a frequency equal to the frequency of rotation of the shutter and if the shutter is rotated at a sufficiently high frequency, for example, 3600 r.p.m., then the repetition rate of images on the left and right hand eye is sufficient so that the right eye retains the right hand image for the half cycle period until the left eye is seeing the left hand image and, consequently, the observer sees a three-dimensional image with the left view being presented to the left eye and the right view being presented to the right eye. It should be noted that no eye pieces are required and the position of the eyes within the exit pupil is uncritical provided only that the left hand eye in the left half of the exit pupil and the right hand eye in the right half of the exit pupil.

An optical system of the type described is ideally suited for operation in conjunction with an X-ray source image intensifier system to provide stereoscopic fluoroscopy.

With reference now specifically to FIG. 2, a stereoscopic fluoroscopy system is diagrammatically illustrated. The object to be X-rayed 21 is placed between an image intensifier fluoroscopy unit 24 and a pair of X-ray sources 22 and 23. The image intensifier unit 24 is typically formed with a fluoroscopic screen input and provides on its output screen 25 an intensified image of the fluoroscopic screen input. An object lens 26 and field lens 33 form the optical viewing system for the observer at the exit pupil 30. A shutter 34, which again may be formed as a semi-circular opaque section of a disc, is placed just on the output side of object lens 26. The rotation of the shutter element 34 is controlled from a control unit 36, which also controls the X-ray sources. The X-ray sources 22 and 23 could, for example, be X-ray generator tubes, which may be electronically controlled to provide a pulse of X-rays at a desired time for a desired interval. A particularly suitable type of X-ray generator is a grid controlled X-ray source which permits precision control.

Having described the components and their interconnection the operation of the system will now be discussed. The source control unit 36 actuates the right hand X-ray source 23 for a short period, thus projecting on the input of the image intensifier a shadow image of object 21 as viewed from the right hand source. The image intensifier then provides an intensified version of this image on its output screen 25. The shutter 34, which is also controlled from the control unit 36 is positioned on the left hand side of the object lens (as shown) and, hence, the image projected from the right hand X-ray source is seen only by the left eye 32 of the observer, while the light says for the right eye 31 have been intercepted by the shutter, which is typically black. It should be noted that in the instance of X-rays, the image is a shadow image and, hence, provided that the image intensifier presents a non-inverted output image, the left eye must see the image created from the right hand source and the right eye sees the image created from the left hand source. This will yield the proper three-dimensional perspective, that is, the perspective of the object observed by an observer with his eyes at the image intensifier input screen. If, on the other hand, it is desired to view the image in reversed perspective, for example, if the observer is on the same side of the object as the X-ray sources, then the left source image should be presented to the left eye and the right source image should be presented to the right eye.

In order to minimize any distortion in the image seen, the X-ray pulse should occur only when the semi-circular opaque section of the shutter exactly covers one side of the object lens with the straight section of the semi-circle vertically bisecting the lens. In order to accomplish this, the duration of the X-ray pulse is made short compared to the time of one complete revolution of the shutter. The shutter is rotated at a speed suitable for providing a non-flicking three-dimensional image. A shutter rotation speed of 3600 r.p.m. has been found satisfactory for the intensities typically provided from the output of an image intensifier.

A system as depicted in FIG. 2 for stereoscopic fluoroscopy is advantageous for the radiologist in that his head movement is no more restricted than it is with normal two-dimensional intensifier fluoroscopy where he is required to maintain his head within the exit pupil of the system in order to view the intensified two-dimensional image. Since he is not required to wear eye pieces, or the like, he is free to view the object being X-rayed directly and has maximum freedom for operating the controls of the X-ray system.

While the optical stereoscopic system of this invention has been described above in a stereoscopic fluoroscopy system, its usefulness is not so limited. Thus, it may be utilized wherever a single observer is viewing three-dimensional images and is particularly suitable where the observer is operating the system for long periods of time and, hence, a fixed physical position lowers his efficiency. It also is very useful wherever the observer is required to perform other manipulations. Typical examples of these applications are closed circuit television manipulation controls where a pair of television cameras may be used to provide the images and a single receiver or monitor viewed through the optical system of this invention. The stereoscopic system of this invention may be also used to provide three-dimensional viewing systems for radar, electron microscopes and other similar devices.

Having described the invention, modifications and improvements will now be suggested to those skilled in this art and the invention herein should, therefore, be construed as limited only by the spirit and scope of the appended claims.

What is claimed is:

1. An optical apparatus comprising, a viewing screen; means for presenting in alternate time sequence left and right hand view images of an object on said viewing screen; an object lens arranged to form an image of said viewing screen; a field lens in axial alignment with said object lens, said field lens and said object lens being arranged to form an exit pupil having a diameter sufficiently large to include within it both the left and right hand eyes of an observer; a shutter element disposed intermediate said object lens and said field lens, said shutter element being formed with an opaque portion adapted to mask one-half of said object lens, means for operating said shutter to alternately mask the left and right hand halves of said object lens, said means for presenting images being operated in conjunction with said shutter element such that left hand images are presented only when said shutter is masking one half of said object lens and right hand images are presented only when said shutter is masking the other half of said object lens.

2. Apparatus in accordance with claim 1 wherein said shutter element is disposed between said object lens and the point of intersection of the axis of alignment and a straight line connecting the perimeters of said object lens and said field lens.

3. An optical apparatus comprising, a viewing screen; means for presenting in alternate time sequence left and right hand view images of an object on said viewing screen; an object lens formed from a positive lens spaced apart from said viewing screen; a field lens disposed with respect to said object lens in such a manner as to provide an exit pupil having a diameter sufficiently large to include within it both the left and right hand eyes of an observer; a rotatable disc disposed intermediate said object lens and said field lens, said disc being formed with one-half of its surface opaque, said opaque half of said disc being adapted to mask one-half said object lens; means for rotating said disc at a speed related to the time sequence of presentation of said left and right hand view images to said viewing screen, such that said opaque half of said disc masks the left hand half of said object lens when said right hand view image is being presented and said opaque section of said disc masks said right half of said object lens when said left hand view image is being presented.

4. An optical apparatus comprising, a viewing screen; means for presenting in alternate time sequence left and right hand projected shadow images of an object on said viewing screen; an object lens arranged to form an image of said viewing screen; a field lens disposed with respect to said object lens in such a manner as to provide an exit pupil having a diameter sufficiently large to include within it both the eyes of an observer; a shutter element disposed intermediate said object lens and said field lens, said shutter being formed with a semi-circular opaque portion adapted to mask one-half of said object lens, means for operating said shutter to alternately mask the left and right hand of said object lens, said shutter operating means and said image presentation means being arranged such that said left hand half of said object lens is masked when said left hand view images are being presented to said viewing screen and said right hand half of said object lens is masked when said right hand view images are being presented to said viewing screen.

5. Apparatus for providing a stereoscopic X-ray image of an object comprising, an image forming screen; first and second X-ray sources, said first X-ray source being disposed to project on said image screen an X-ray image of said object projected from the right, said second X-ray source being adapted to project on said image screen an X-ray image projected from the left of said object; an object lens adapted to form an image of said image screen; a field lens disposed with respect to said object lens in such a fashion as to provide an exit pupil having a diameter sufficiently large to include within it both the eyes of the observer; a shutter element disposed intermediate said object lens and said field lens, said shutter element having an opaque portion adapted when in one position to mask the left hand half of said object lens and when in another position to mask the right hand half of said object lens; means for alternately actuating said first and said second X-ray sources to alternately present left and right hand X-ray images to said image forming screen; means for operating said shutter member to alternately mask said left and said right hand half of said object lens, said shutter operating means and said X-ray source actuating means being operated in conjunction such that such shutter member is masking said right hand half of said object lens when said first X-ray source is actuated and said shutter member is masking said left hand half of said object lens when said second X-ray source is being actuated.

References Cited by the Examiner
UNITED STATES PATENTS

| | | | |
|---|---|---|---|
| 1,390,250 | 9/1921 | Rodriguez | 250—60 |
| 2,891,444 | 6/1959 | Ewald | 88—29 |
| 3,004,159 | 10/1961 | Branciccio | 250—60 |

FOREIGN PATENTS

| | | |
|---|---|---|
| 149,376 | 8/1920 | Great Britain. |
| 707,852 | 4/1954 | Great Britain. |

OTHER REFERENCES

Fundamentals of Optics, by F. A. Jenkins et al., third edition, 1957, pages 98 and 99.

RALPH G. NILSON, *Primary Examiner.*

ARTHUR GAUSS, *Examiner.*

W. F. LINDQUIST, *Assistant Examiner.*